US008850256B2

(12) United States Patent
Shibayama

(10) Patent No.: US 8,850,256 B2
(45) Date of Patent: Sep. 30, 2014

(54) COMMUNICATION CIRCUIT AND COMMUNICATION METHOD

(75) Inventor: Atsufumi Shibayama, Tokyo (JP)

(73) Assignee: Nec Corporation, Tokyo (JP)

( * ) Notice: Subject to any disclaimer, the term of this patent is extended or adjusted under 35 U.S.C. 154(b) by 403 days.

(21) Appl. No.: 13/256,703

(22) PCT Filed: Mar. 26, 2010

(86) PCT No.: PCT/JP2010/002189
§ 371 (c)(1),
(2), (4) Date: Sep. 15, 2011

(87) PCT Pub. No.: WO2010/134252
PCT Pub. Date: Nov. 25, 2010

(65) Prior Publication Data
US 2012/0096300 A1   Apr. 19, 2012

(30) Foreign Application Priority Data
May 18, 2009   (JP) ................................ 2009-120126

(51) Int. Cl.
*G06F 1/04* (2006.01)
*G06F 1/32* (2006.01)
(52) U.S. Cl.
CPC ........... *G06F 1/3203* (2013.01); *Y02B 60/1217* (2013.01); *Y02B 60/1235* (2013.01); *G06F 2213/0038* (2013.01); *G06F 1/3253* (2013.01)
USPC ...................................................... 713/375
(58) Field of Classification Search
CPC ............... G06F 1/06; G06F 1/08; G06F 1/04; G06F 1/10; G06F 9/522; G06F 11/0724; H03L 7/08
USPC ......................................... 713/500–503, 375
See application file for complete search history.

(56) References Cited

U.S. PATENT DOCUMENTS 3,241,033 A * 3/1966 Murray Rosenblatt et al. .. 363/4
4,368,514 A * 1/1983 Persaud et al. ................ 709/211
4,803,617 A * 2/1989 Berarducci ..................... 712/11
(Continued)

FOREIGN PATENT DOCUMENTS

JP        5-283523 A     10/1993
JP      11-145298 A      5/1999
(Continued)

OTHER PUBLICATIONS

International Search Report for PCT/JP2010/002189 mailed Jun. 29, 2010.

(Continued)

*Primary Examiner* — Paul R Myers
(74) *Attorney, Agent, or Firm* — Sughrue Mion, PLLC

(57) ABSTRACT

Provided is a communication circuit (10) connected with a plurality of function blocks (A, B) that perform processing based on a first clock signal, and mediates communication between the function blocks (A, B). The communication circuit (10) includes N number of communication means, where N is a positive integer, having the same data width as communication data output from the function blocks, and each of the N number of communication means performs communication processing based on N number of second clock signals specified by 1/N of a frequency of the first clock signal, respectively corresponding to the N number of communication means and having a phase difference of 360/N degrees from each other. This makes it possible to provide a communication circuit between function blocks in which the amount of necessary hardware and power consumption is small, the timing design is easy, and the communication latency is low.

14 Claims, 15 Drawing Sheets

(56) References Cited

U.S. PATENT DOCUMENTS

| | | | |
|---|---|---|---|
| 5,826,067 A * | 10/1998 | Fisch et al. | 713/503 |
| 6,380,774 B2 * | 4/2002 | Saeki | 327/119 |
| 6,484,268 B2 * | 11/2002 | Tamura et al. | 713/600 |
| 6,950,956 B2 * | 9/2005 | Zerbe et al. | 713/400 |
| 2011/0241747 A1 * | 10/2011 | Prathapan et al. | 327/291 |

FOREIGN PATENT DOCUMENTS

| | | |
|---|---|---|
| JP | 2000347993 A | 12/2000 |
| JP | 2005242658 A | 9/2005 |
| JP | 2007220046 A | 8/2007 |
| JP | 2008-59134 A | 3/2008 |
| JP | 2009-105877 A | 5/2009 |
| JP | 2010-56649 A | 3/2010 |

OTHER PUBLICATIONS

Japanese Office Action for JP Application No. 2011-514300 mailed on Jul. 2, 2013 with English Translation.

* cited by examiner

COMMUNICATION CIRCUIT AND COMMUNICATION METHOD

TECHNICAL FIELD

The present invention relates to a semiconductor integrated circuit that includes a plurality of function blocks and, particularly, to a communication circuit and a communication method that realize data communication between a plurality of function blocks.

BACKGROUND ART

With the progress towards finer design rules in semiconductor process, the number of function blocks (which are also called cores) that are integrated into a semiconductor integrated circuit is on the increase. Further, the operating frequency of each function block is becoming increasingly higher. However, in such a semiconductor integrated circuit, it has become difficult to perform communication between function blocks with a frequency which is equal to the operating frequency of each function block due to a higher-speed clock signal, greater fluctuations and the like. This results in the degradation of communication capability between function blocks compared to data processing capability of each function block.

An approach to address the above issue is a pipeline technique to speed up the operating frequency of a communication circuit (e.g. on-chip bus, on-chip interconnect, on-chip network etc.) between function blocks (see Patent Literature 1).

FIG. 12 is a view showing a configuration of a communication circuit between function blocks by the pipeline technique. In FIG. 12, a communication circuit 100 is a communication circuit that transfers data that is output from a function block A to a function block B. To be more specific, data that is output from the function block A to a signal 113 is input to the communication circuit 100 near the function block A, and the communication circuit 100 transfers the data to near the function block B, and outputs the data to a signal 114. The data that is output to the signal 114 is then input to the function block B. The signal 113 and the signal 114 are signals including a plurality of bits and having the same data width.

All of the function block A, the function block B and the communication circuit 100 operate with a clock F, which is the same high-speed clock. The communication circuit 100 is composed of four stages of pipeline circuits in order to achieve the same operating frequency as the function block A and the function block B. Specifically, in the communication circuit 100, a signal to transfer data is divided into four sub-signals 112a, 112b, 112c and 112d by pipeline registers 110a, 110b, 110c, 110d, 110e. Each of the sub-signals 112a, 112b, 112c and 112d is a signal including a plurality of bits and having the same data width as the signal 113 and the signal 114.

Further, a plurality of buffer circuits 111a, 111b, 111c and 111d for driving each sub-signal are respectively inserted into the sub-signals 112a, 112b, 112c and 112d. Although not shown in FIG. 12, in addition to the buffer circuits, selector circuits, switch circuits and the like for switching a communication path may be included as appropriate.

Next, an example of the operation of the communication circuit 100 is described with reference to FIG. 13. FIG. 13 is an explanatory view showing the timing of data transfer from the function block A to the function block B.

In FIG. 13, data D0 that is output from the function block A to the signal 113 at the timing T0 is input to the communication circuit 100 at the timing T1. Specifically, at the timing T1, the pipeline register 110a latches the data D0 and outputs it to the sub-signal 112a. Likewise, at the timing T2, the pipeline register 110b latches the data D0 and outputs it to the sub-signal 112b. Subsequently, at the timing T3 to T5, the data D0 is sequentially output to the signals 112c, 112d and 114 via the pipeline registers 110c, 110d and 110e in the same manner. Consequently, the data D0 arrives at the function block B at the timing T5.

Likewise, data D1 that is output from the function block A to the signal 113 at the timing T1 is input to the communication circuit 100 at the timing T2. Specifically, at the timing T2, the pipeline register 110a latches the data D1 and outputs it to the sub-signal 112a. Likewise, at the timing T3, the pipeline register 110b latched the data D1 and outputs it to the sub-signal 112b. Subsequently, at the timing T4 to T6, the data D1 is sequentially output to the signals 112c, 112d and 114 via the pipeline registers 110c, 110d and 110e in the same manner. Consequently, the data D1 arrives at the function block B at the timing T6.

After that, in the same manner, data D2 to D7 that are output from the function block A at the timing T2 to T7 arrive at the function block B at the timing T7 to T12. In the example of FIG. 13, it takes five cycles of the clock F until the data output from the function block A arrives at the function block B (for example, the data D0 is output from the function block A at the timing T0 and arrives at the function block B at the timing T5). Thus, the latency of data transfer from the function block A to the function block B is five cycles of the clock F.

On the other hand, the communication circuit 100 is composed of four stages of pipeline circuits, and data transfer is implemented by pipeline. Therefore, data transfer can be done in each cycle of the clock F despite that the latency is five cycles. In other words, the throughput of data transfer from the function block A to the function block B is 1 (which indicates transferring one data per cycle of the clock F).

Further, another means to improve the communication performance of a communication circuit is a method of expanding the data width of the communication circuit (see Patent Literature 2). An example is a method that expands the data width of the communication circuit to N times (N is a positive integer) the data width of the function block, and makes the communication circuit operate with a clock having a frequency of 1/N. Because N times larger data per cycle can be thereby transferred, communication can be done without a decrease in throughput even if the operating frequency is 1/N.

FIG. 14 is a view showing a configuration of a communication circuit between function blocks by the technique of expanding the data width. In FIG. 14, data that is output from a function block A to a signal 163 is input to a communication circuit 150 near the function block A, and the communication circuit 150 transfers the data to near a function block B, and outputs the data to a signal 164. The data that is output to the signal 164 is then input to the function block B.

The communication circuit 150 includes four signals 162a, 162b, 162c and 162d. Each of the signals 162a, 162b, 162c and 162d is a signal including a plurality of bits and having the same data width as the signal 163 and the signal 164. Thus, the communication circuit 150 as a whole is provided with signals with the data width of four times that of the signal 163 and the signal 164. Further, a plurality of buffer circuits 161a, 161b, 161c and 161d for driving each signal are respectively inserted into the signals 162a, 162b, 162c and 162d.

The communication circuit 150 further includes input data storage circuits 160a and 160b, an input control circuit 166, an output data storage circuit 165, and an output control circuit 167. The function block A and the function block B operate with a clock F, which is a high-speed clock signal. The input data storage circuits 160a and 160b and the output control circuit 167 of the communication circuit 150 also operate with the clock F.

On the other hand, the input control circuit 166 and the output data storage circuit 165 operate with a clock S, which is a low-speed clock signal. The frequency of the clock S is ¼ the frequency of the clock F.

Next, an example of the operation of the communication circuit 150 is described with reference to FIG. 15. FIG. 15 is an explanatory view showing the timing of data transfer from the function block A to the function block B. In FIG. 15, data D0 that is output from the function block A to the signal 163 at the timing T0 is input to the communication circuit 150 at the timing T1. Specifically, the data D0 is stored into the input data storage circuit 160a at the timing T1. Likewise, in the communication circuit 150, data D1 that is output from the function block A to the signal 163 at the timing T1 is additionally stored into the input data storage circuit 160a at the timing T2. Likewise, in the communication circuit 150, data D2 that is output from the function block A to the signal 163 at the timing T2 is additionally stored into the input data storage circuit 160a at the timing T3. Likewise, in the communication circuit 150, data D3 that is output from the function block A to the signal 163 at the timing T3 is additionally stored into the input data storage circuit 160a at the timing T4. As a result, the data D0, D1, D2 and D3 are stored in the input data storage circuit 160a at the timing T4.

After the four data D0, D1, D2 and D3 are all stored in the input data storage circuit 160a, at the timing T6, which is the timing at the next rising edge of the clock S, the input control circuit 166 outputs the stored data D0, D1, D2 and D3 to the signals 162a, 162b, 162c and 162d, respectively.

Then, at the timing T10, which is the timing at the subsequent rising edge of the clock S, the output data storage circuit 165 stores the data D0, D1, D2 and D3 that are output from the input control circuit 166 at the timing 16.

The output control circuit 167 outputs the data D0, out of the data D0, D1, D2 and D3 stored in the output data storage circuit, to the signal 164 at the timing T10. Consequently, the data D0 arrives at the function block B at the timing T10. Likewise, the output control circuit 167 outputs the data D1 at the timing T11, outputs the data D2 at the timing T12, and outputs the data D3 at the timing T13, to the signal 164. Consequently, the data D1, D2 and D3 arrive at the function block B at the timing T11, T12 and T13, respectively.

Although the operation for communicating the data D0, D1, D2 and D3 is described above, the same applies to data D4, D5, D6 and D7.

In FIG. 15, data D4 that is output from the function block A to the signal 163 at the timing T4 is input to the communication circuit 150 at the timing T5. Specifically, the data D4 is stored into the input data storage circuit 160b at the timing T5. Likewise, in the communication circuit 150, data D5 that is output from the function block A to the signal 163 at the timing T5 is additionally stored into the input data storage circuit 160b at the timing T6. Likewise, in the communication circuit 150, data D6 that is output from the function block A to the signal 163 at the timing T6 is additionally stored into the input data storage circuit 160b at the timing T7. Likewise, in the communication circuit 150, data D7 that is output from the function block A to the signal 163 at the timing T7 is additionally stored into the input data storage circuit 160b at the timing T8.

As a result, the data D4, D5, D6 and D7 are stored in the input data storage circuit 160b at the timing T8.

After the four data D4, D5, D6 and D7 are all stored in the input data storage circuit 160b, at the timing T10, which is the timing at the next rising edge of the clock S, the input control circuit 166 outputs the stored data D4, D5, D6 and D7 to the signals 162a, 162b, 162c and 162d, respectively.

Then, at the timing T14, which is the timing at the subsequent rising edge of the clock S, the output data storage circuit 165 stores the data D4, D5, D6 and D7 that are output from the input control circuit 166 at the timing T10.

The output control circuit 167 outputs the data D4, out of the data D4, D5, D6 and D7 stored in the output data storage circuit, to the signal 164 at the timing T14. Consequently, the data D4 arrives at the function block B at the timing T14. Likewise, the output control circuit 167 outputs the data D5 at the timing T15, outputs the data D6 at the timing T16, and outputs the data D7 at the timing T17, to the signal 164. Consequently, the data D5, D6 and D7 arrive at the function block B at the timing T15, T16 and T17.

As described above, because the data width of the communication circuit 150 is four times the data width of the signal 163 that is output from the function block A, four times larger data per cycle can be transferred. Stated differently, provided that data can be transferred in each cycle of the clock S, even when the frequency of the clock S is ¼ the frequency of the clock F, the throughput of data transfer from the function block A to the function block B can be 1 (which indicates transferring one data per cycle of the clock F).

To be more generalized, the communication circuit shown in FIG. 14 requires N times more signal lines than the communication circuit shown in FIG. 12 because the data width of the communication circuit is set to N times (N is a positive integer) the data width of the function block. On the other hand, the communication circuit shown in FIG. 14 has an advantage that the pipeline registers are not necessary, and the frequency is low, so that power consumption is small.

CITATION LIST

Patent Literature

Patent Literature 1: Japanese Unexamined Patent Application Publication No. 2007-220046

Patent Literature 2: Japanese Unexamined Patent Application Publication No. 2005-242658

SUMMARY OF INVENTION

Technical Problem

However, in the communication circuit 100 by the pipeline technique shown in FIG. 12, it is necessary to increase the number of number of pipeline stages in order to achieve the speedup of the operating frequency. Because many pipeline stages are thereby required, there is a problem that the circuit area and power consumption are large. Further, because the operating frequency is high, there is a problem that the timing design is difficult.

On the other hand, in the communication circuit 150 shown in FIG. 14, it is necessary to make buffering of N times larger data, which is a unit of data transmitted at a time, in order to transfer data in each cycle of the clock S. Therefore, in the communication circuit 150 shown in FIG. 14, transfer cannot be done until N times larger data are all ready as shown in P1 of FIG. 15, and there is thus a problem that the latency increases by N-1 cycle.

There is also a problem that, if the phase (timing at the rising edge) does not coincide between the clock of the high-speed function block (the clock F) and the low-speed communication clock (the clock S), the latency increases until the phase coincides (N-1 to 1 cycle) as shown in P2 of FIG. 15. Therefore, it is necessary to make the input data storage circuit redundant (double buffering) in order to enable data transfer in each cycle of the clock S. In the communication circuit 150 shown in FIG. 14, redundancy is achieved by use of the input data storage circuits 160a and 160b. There is thus a problem that the amount of necessary hardware increases.

An object of the present invention is thus to provide a communication circuit and a communication method between function blocks in which the amount of necessary hardware and power consumption is small, the timing design is easy, and the communication latency is low.

Solution to Problem

A communication circuit according to the present invention is a communication circuit connected with a plurality of function blocks that perform processing based on a first clock signal, and mediates communication between the function blocks. The communication circuit includes N number of communication means, where N is a positive integer, having the same data width as communication data output from the function blocks, and each of the N number of communication means performs communication processing based on N number of second clock signals specified by 1/N of a frequency of the first clock signal, respectively corresponding to the N number of communication means and having a phase difference of 360/N degrees from each other.

Further, a communication method according to the present invention using a communication circuit connected with a first function block and a second function block and transferring communication data from the first function block to the second function block, the communication circuit including first to Nth communication means, where N is a positive integer, having the same data width as the communication data output from the first function block, includes the following steps: a first step of inputting the communication data output from the first function block according to a first clock signal to the first to Nth communication means based on second clock signals specified by 1/N of a frequency of the first clock signal and having first to Nth phases with a phase difference of 360/N degrees from each other, and a second step of outputting the communication data supplied to the first to Nth communication means to the second function block based on the second clock signals having the first to Nth phases.

Advantageous Effects of Invention

According to the present invention, it is possible to provide a communication circuit and a communication method between function blocks in which the amount of necessary hardware and power consumption is small, the timing design is easy, and the communication latency is low.

DESCRIPTION OF EMBODIMENTS

First Exemplary Embodiment

Exemplary embodiments of the present invention are described hereinafter with reference to the drawings.

Figure 1:
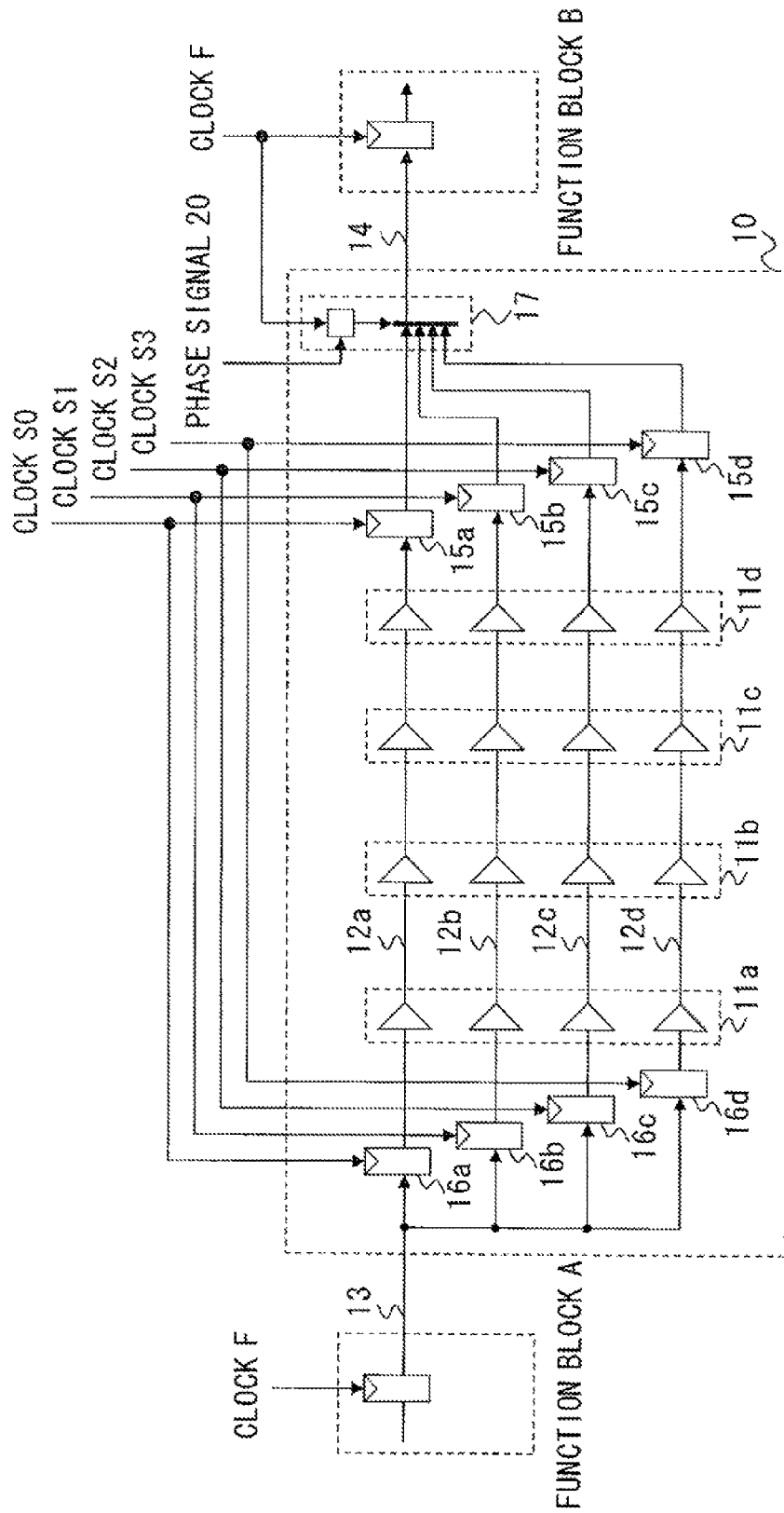
FIG. 1 is a block diagram showing a communication circuit between function blocks according to a first exemplary embodiment.

FIG. 1 is a block diagram showing a configuration of a communication circuit between function blocks according to a first exemplary embodiment. In FIG. 1, a communication circuit 10 is a communication circuit that transfers data that is output from a function block A to a function block B. To be more specific, data that is output from the function block A to a signal 13 is input to the communication circuit 10 near the function block A, and the communication circuit 10 transfers the data to near the function block B, and outputs the data to a signal 14. The data that is output to the signal 14 is then input to the function block B. The signal 13 and the signal 14 are signals including a plurality of bits and having the same data width.

The communication circuit 10 includes four signals 12a, 12b, 12c and 12d. The signals 12a, 12b, 12c and 12d are signals including a plurality of bits and having the same data width as the signal 13 and the signal 14. Thus, the communication circuit 10 as a whole includes signals with the data width of four times that of the signal 13 and the signal 14.

The communication circuit 10 further includes input data storage circuits (input data storage means) 16a, 16b, 16c and 16d, which are respectively connected at the input side of the signals 12a, 12b, 12c and 12d. The communication circuit 10 further includes output data storage circuits (output data storage means) 15a, 15b, 15c and 15d, which are respectively connected at the output side of the signals 12a, 12b, 12c and 12d.

In sum, the communication circuit 10 includes four communication means, that are, a communication means composed of the signal 12a, the input data storage circuit 16a and the output data storage circuit 15a, a communication means composed of the signal 12b, the input data storage circuit 16b and the output data storage circuit 15b, a communication means composed of the signal 12c, the input data storage circuit 16c and the output data storage circuit 15c, and a communication means composed of the signal 12d, the input data storage circuit 16d and the output data storage circuit 15d. Each communication means has the same data width as input and output of the function block, and therefore the communication circuit 10 as a whole has the data width of four times the data width of input and output of the function block.

Further, a plurality of buffer circuits (data transfer means) 11a, 11b, 11c and 11d for driving each signal are respectively inserted into the signals 12a, 12b, 12c and 12d.

The communication circuit 10 further includes an output control circuit (output control means) 17. The output control circuit 17 selects one of outputs of the output data storage circuits 15a, 15b, 15c and 15d by referring to a phase signal 20 which indicates information about the phase relationship of clocks S0 to S3, and outputs the selected one to the signal 14.

The function block A and the function block B operate with a clock F, which is a high-speed clock signal. The output control circuit 17 of the communication circuit 10 also operates with the clock F. On the other hand, the input data storage circuits and the output data storage circuits of the communication circuit 10 operate with a clock S0, a clock S1, a clock S2 and a clock S3, which are four low-speed clock signals. To be more specific, the input data storage circuit 16a and the output data storage circuit 15a operate with the clock S0. The input data storage circuit 16b and the output data storage circuit 15b operate with the clock S1. The input data storage circuit 16c and the output data storage circuit 15c operate with the clock S2. The input data storage circuit 16d and the output data storage circuit 15d operate with the clock S3.

The frequencies of the clock S0, the clock S1, the clock S2 and the clock S3 are ¼ the frequency of the clock F. Further, the clock S0, the clock S1, the clock S2 and the clock S3 have a phase difference of 360/4 degrees from each other. Note that the low-speed clock signals such as the clock S0, the clock S1, the clock S2 and the clock S3 can be easily generated using a common clock generation circuit. For example, those clock signals may be generated directly using an oscillator such as a PLL circuit or may be generated by frequency division of the clock F using a frequency divider.

Figure 2:
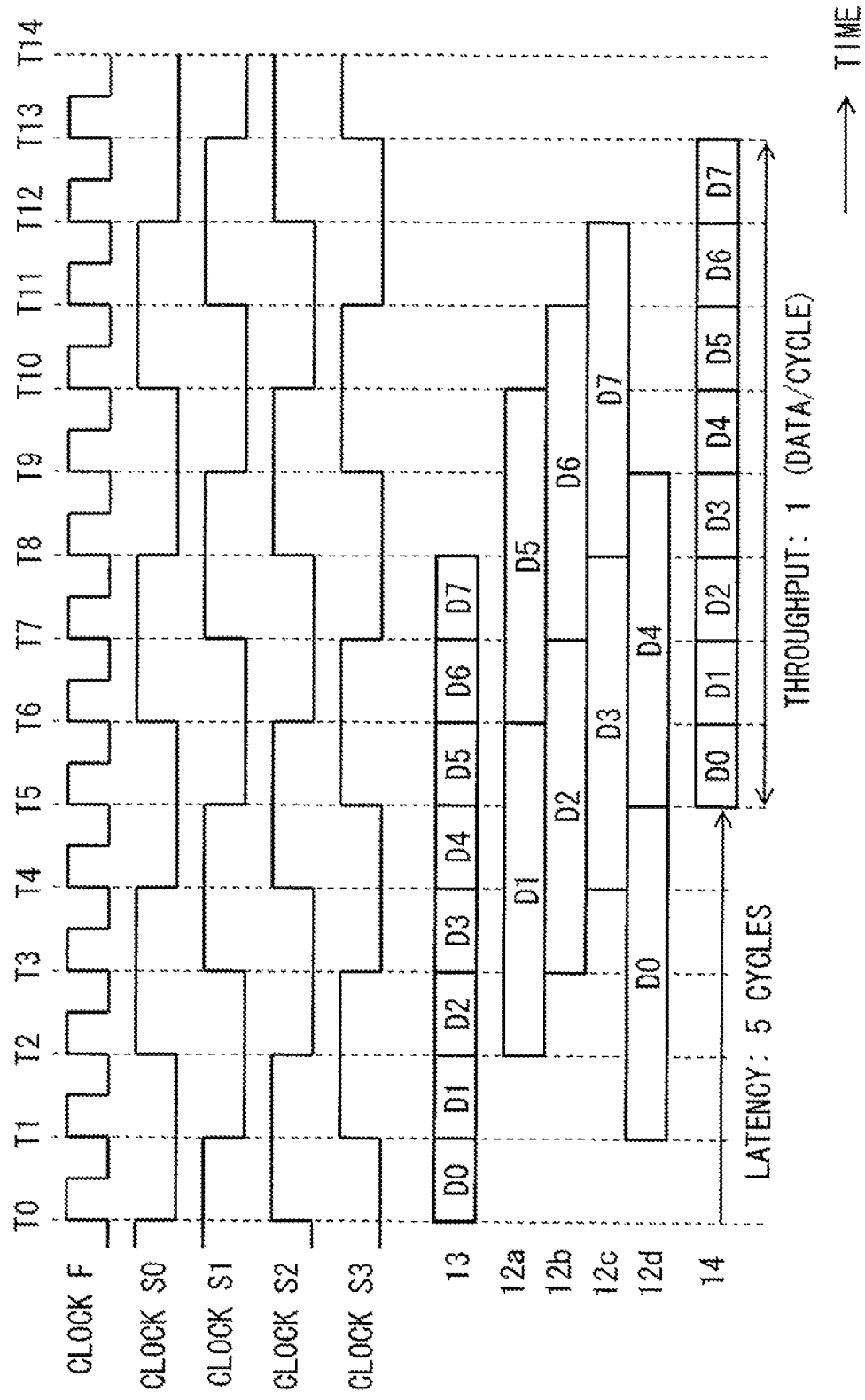
FIG. 2 is a timing chart showing an operation of the communication circuit between function blocks according to the first exemplary embodiment.

Next, an example of the operation of the communication circuit 10 according to the exemplary embodiment is described with reference to FIG. 2. FIG. 2 is an explanatory view showing the timing of data transfer from the function block A to the function block B.

In FIG. 2, the clock S0 rises at the timing T2, T6 and T10, for example. The input data storage circuit 16a stores the data output to the signal 13 at the timing T2, T6 and T10. Further, the output data storage circuit 15a stores the data transferred to the signal 12a at the timing T2, T6 and T10.

Likewise, the clock S1 rises at the timing T3, 17 and T11, for example. The input data storage circuit 16b stores the data output to the signal 13 at the timing T3, T7 and T11. Further, the output data storage circuit 15b stores the data transferred to the signal 12b at the timing T3, T7 and T11.

Likewise, the clock S2 rises at the timing T0, T4, T8 and T12, for example. The input data storage circuit 16c stores the data output to the signal 13 at the timing T0, T4, T8 and T12. Further, the output data storage circuit 15c stores the data transferred to the signal 12c at the timing T0, T4, T8 and T12.

Likewise, the clock S3 rises at the timing T1, T5, T9 and T13, for example. The input data storage circuit 16d stores the data output to the signal 13 at the timing T1, T5, T9 and T13. Further, the output data storage circuit 15d stores the data transferred to the signal 12d at the timing T1, T5, T9 and T13.

As is obvious from the above description, any of the clock S0, the clock S1, the clock S2 and the clock S3 rises without exception at the timing of every rising edge of the clock F. For example, at the timing T0 to T14, which is the timing of the rising edge of the clock F, any of the clock S0, the clock S1, the clock S2 and the clock S3 rises without exception.

As described above, despite that the frequencies of the clock S0, the clock S1, the clock S2 and the clock S3 are ¼ the frequency of the clock F, any of the clock S0, the clock S1, the clock S2 and the clock S3 rises without exception at the timing of every rising edge of the clock F. This is because four clock signals, i.e., the clock S0, the clock S1, the clock S2 and the clock S3, are provided and those clocks have a phase difference of 360/4 degrees from each other.

To be more generalized, in the case of using N number of low-speed clock signals, where N is a positive integer, having a frequency of 1/N that of the clock F and having a phase difference of 360/N degrees from each other, any of the N number of low-speed clock signals rises without exception at the timing of every rising edge of the clock F.

Next, a specific example of a communication operation of the communication circuit 10 according to the exemplary embodiment is described by referring again to FIG. 2. In FIG. 2, data D0 that is output from the function block A to the signal 13 at the timing T0 arrives at the communication circuit 10 at the timing T1. The input data storage circuit 16d that operates at the timing T1 stores the data D0. Concurrently, the data D0 is transferred to the signal 12d and arrives at the output data storage circuit 15d at the timing T5. The output data storage circuit 15d stores the arrived data D0 at the timing T5. Then, the output control circuit 17 determines that the data D0 is stored in the output data storage circuit 15d at the timing T5 by referring to the phase signal 20. The output control circuit 17 selects the data D0 stored in the output data storage circuit 15d and outputs it to the signal 14 at the same timing T5.

Likewise, data D1 that is output from the function block A to the signal 13 at the timing T1 arrives at the communication circuit 10 at the timing T2. The input data storage circuit 16a that operates at the timing T2 stores the data D1. Concurrently, the data D1 is transferred to the signal 12a and arrives at the output data storage circuit 15a at the timing T6. The output data storage circuit 15a stores the arrived data D1 at the timing T6. Then, the output control circuit 17 determines that the data D1 is stored in the output data storage circuit 15a at the timing T6 by referring to the phase signal 20. The output control circuit 17 selects the data D1 stored in the output data storage circuit 15a and outputs it to the signal 14 at the same timing T6.

Likewise, data D2 that is output from the function block A to the signal 13 at the timing T2 arrives at the communication circuit 10 at the timing T3. The input data storage circuit 16b that operates at the timing T3 stores the data D2. Concurrently, the data D2 is transferred to the signal 12b and arrives at the output data storage circuit 15b at the timing T7. The output data storage circuit 15b stores the arrived data D2 at the timing T7. Then, the output control circuit 17 determines that the data D2 is stored in the output data storage circuit 15b at the timing T7 by referring to the phase signal 20. The output control circuit 17 selects the data D2 stored in the output data storage circuit 15b and outputs it to the signal 14 at the same timing T7.

Likewise, data D3 that is output from the function block A to the signal 13 at the timing T3 arrives at the communication circuit 10 at the timing T4. The input data storage circuit 16c that operates at the timing T4 stores the data D3. Concurrently, the data D3 is transferred to the signal 12c and arrives at the output data storage circuit 15c at the timing T8. The output data storage circuit 15c stores the arrived data D3 at the timing T8. Then, the output control circuit 17 determines that the data D3 is stored in the output data storage circuit 15c at the timing T8 by referring to the phase signal 20. The output control circuit 17 selects the data D3 stored in the output data storage circuit 15c and outputs it to the signal 14 at the same timing T8.

As described above, the data D0 to D3 that are output from the function block A at the timing T0 to T3 are output to the signal 14 and arrive at the function block B at the timing T5 to T8. Therefore, the latency of data transfer from the function block A to the function block B is five cycles of the clock F. Further, the throughput of data transfer from the function block A to the function block B is 1 which indicates transferring one data per cycle of the clock F). After that, in the same manner, data D4 to D7 that are output from the function block A at the timing T4 to T7 are output to the signal 14 and arrive at the function block B at the timing T9 to T12.

In the following, the case of using four low-speed clock signals, i.e., the clock S0, the clock S1, the clock S2 and the clock S3, having a frequency of ¼ that of the clock F, which is a clock signal of the function block, and having a phase difference of 360/4 degrees from each other is described by way of illustration. However, the exemplary embodiment is not limited thereto and is equally applicable to any positive integer N. Specifically, N number of low-speed clock signals having a frequency of 1/N that of the clock F, which is a clock signal of the function block, and having a phase difference of 360/N degrees from each other may be used.

As described above, in this exemplary embodiment, data can be communicated sequentially at a frequency of ¼ that of the clock F for each data width of input and output of the function block and each cycle of the clock F, which is a clock signal of the function block. This is because the four low-speed clock signals used in the communication, i.e., the clock S0, the clock S1 the clock S2 and the clock S3, have a phase difference of 360/4 degrees from each other, and therefore any of the clock signals has a rising edge coinciding with the clock F. This is also because the output control circuit 17 outputs the data stored in the output data storage circuit to the signal 14 in the sequence the data is stored. Further, this is also because the output control circuit 17 outputs the data stored in any of the output data storage circuits to the signal 14 in the cycle the data is stored.

To be more generalized, in this exemplary embodiment, N number of low-speed clock signals, where N is a positive integer, having a frequency of 1/N that of a clock signal of function blocks, are used for communication. Further, the clock signals have a phase difference of 360/N degrees from each other, and therefore any of the clock signals has a rising edge coinciding with the clock F. Thus, in this exemplary embodiment, data can be communicated sequentially at a frequency of 1/N that of a clock signal of function blocks, for each data width of input and output of the function block and each cycle of the clock F, which is a clock signal of the function block.

In the communication circuit according to the exemplary embodiment, the frequency of a clock signal used for communication can be lowered, so that the timing design can be easy. Further, the need for pipeline can be eliminated or, even if pipeline is used, the number of pipeline stages can be reduced, so that the circuit area and power consumption can be reduced.

Further, in the communication circuit according to the exemplary embodiment, communication is performed for each data width of input and output of the function block, and there is thus no need to make buffering of data to be communicated and no need to wait until all of data to be communicated are ready, so that an increase in latency can be suppressed.

Furthermore, in the communication circuit according to the exemplary embodiment, communication can be performed for each cycle of a clock signal of the function block, and there is thus no need to wait until the phase coincides between the clock signal of the function block and a clock signal used for the communication, so that an increase in latency can be suppressed. In addition, there is no need to make the input data storage circuit redundant (double buffering), so that the circuit area and power consumption can be reduced.

A communication method according to the exemplary embodiment is described hereinbelow.

The communication circuit 10 is connected with a first function block (the function block A) and a second function block (the function block B), and transfers communication data from the first function block to the second function block. The communication circuit 10 includes first to Nth communication means, where N is a positive integer, having the same data width as the communication data output from the first function block.

The communication method according to the exemplary embodiment includes a first step of inputting communication data output from the first function block according to a first clock signal to the first to Nth communication means based on second clock signals specified by 1/N of a frequency of the first clock signal and having first to Nth phases with a phase difference of 360/N degrees from each other. The method further includes a second step of outputting the communication data supplied to the first to Nth communication means to the second function block based on the second clock signals having the first to Nth phases.

The second step may be a step of outputting the communication data supplied to the first to Nth communication means to the second function block based on the second clock signal having a phase corresponding to the phase of the second clock signal when inputting the communication data among the second clock signals having the first to Nth phases.

By using the communication method according to the exemplary embodiment, it is possible to provide a communication method between function blocks in which the amount of necessary hardware and power consumption is small, the timing design is easy, and the communication latency is low.

Second Exemplary Embodiment

A communication circuit between function blocks according to a second exemplary embodiment of the present invention is described hereinafter with reference to FIG. 3. In the communication circuit between function blocks described in the first exemplary embodiment, the output control circuit 17 outputs data stored in any of the output data storage circuits to the signal 14 in the sequence the data is stored. Further, the output control circuit 17 outputs the data stored in any of the output data storage circuits to the signal 14 in the cycle the data is stored. Communication between function blocks with a low latency is thereby achieved for each data width of input and output of the function block and each cycle of the clock signal of the function block. The output control circuit 17 makes data selection by referring to the phase signal 20 indicating information about the phase relationship and thereby achieves data output in the same cycle as the arrival of data.

Figure 3:
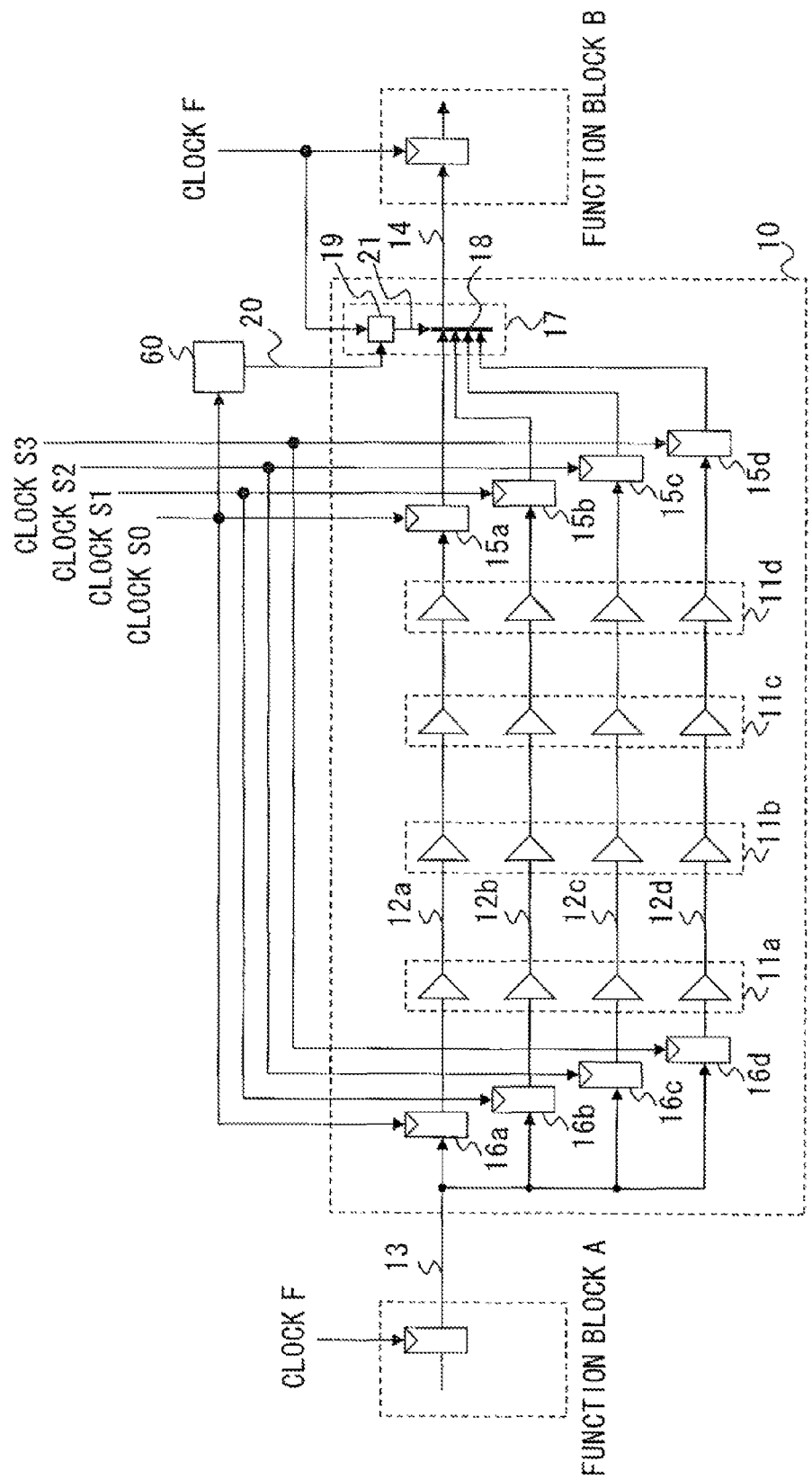
FIG. 3 is a block diagram showing a communication circuit between function blocks according to a second exemplary embodiment.

On the other hand, the communication circuit between function blocks according to this exemplary embodiment shown in FIG. 3 has a configuration in which a phase detection circuit (phase detection means) 60 that generates the phase signal 20 is added to the configuration of the communication circuit between function blocks described in the first exemplary embodiment. In the communication circuit between function blocks according to this exemplary embodiment, the components common to those in the first exemplary embodiment are not redundantly described.

The phase detection circuit 60 receives the clock S0 and detects the timing at the rising edge of the clock S0 to thereby detect the phases of the clocks S0 to S3, and output them as the phase signal 20. An output selection circuit 17 includes a selector circuit 18 and a counter circuit 19. The selector circuit 18 selects any one of outputs of the output data storage circuits 15a, 15b, 15c and 15d according to a data selection signal 21 that is output from the counter circuit 19 and outputs the selected one to the signal 14.

Specifically, when the value of the data selection signal 21 is "0", the selector circuit 18 selects output of the output data storage circuit 15a and outputs it to the signal 14. When the value of the data selection signal 21 is "1", the selector circuit 18 selects output of the output data storage circuit 15b and outputs it to the signal 14. When the value of the data selection signal 21 is "2", the selector circuit 18 selects output of the output data storage circuit 15c and outputs it to the signal 14. When the value of the data selection signal 21 is "3", the selector circuit 18 selects output of the output data storage circuit 15d and outputs it to the signal 14.

The counter circuit 19 performs a count operation by the clock F and outputs the count value as the data selection signal 21. Further, the counter circuit 19 performs a reset operation by referring to the phase signal 20.

Figure 4:
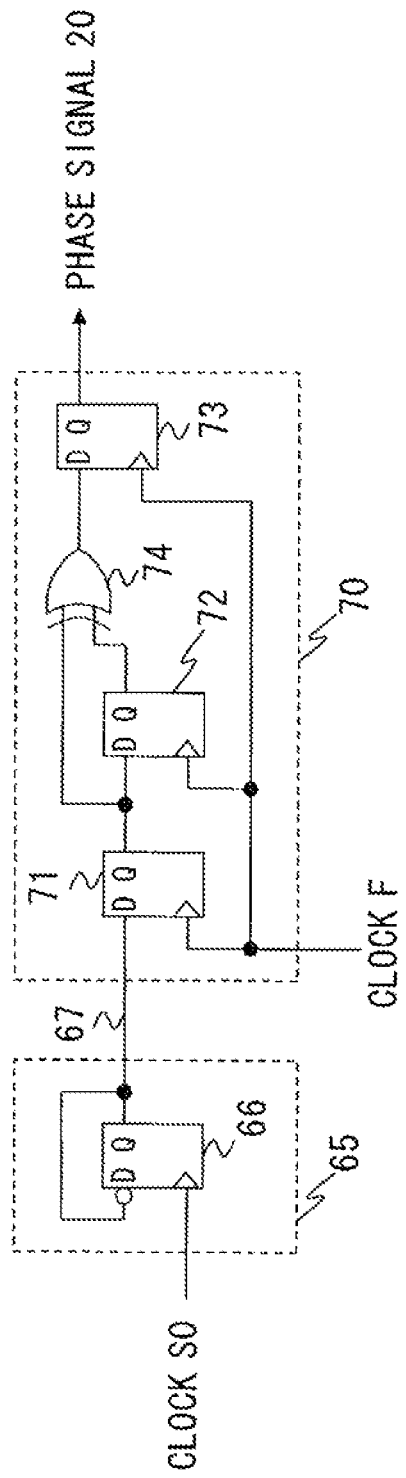
FIG. 4 is a block diagram showing a phase detection circuit of the communication circuit between function blocks according to the second exemplary embodiment.

FIG. 4 is a specific example of the phase detection circuit 60. The phase detection circuit 60 includes a toggle circuit 65 and a toggle detection circuit 70. The toggle circuit 65 operates with the clock S0 and generates a toggle signal 67 whose value is toggled at each rising timing of the clock S0. The toggle detection circuit 70 operates with the clock F, receives the toggle signal 67, and detects the rising and falling timing, which is toggle timing of the toggle signal 67. Then, at the toggle timing, the phase detection circuit 60 generates the phase signal 20 whose value becomes "1" two cycles after the timing at the rising edge of the clock S0 and becomes "0" at the other timing.

Figure 5:
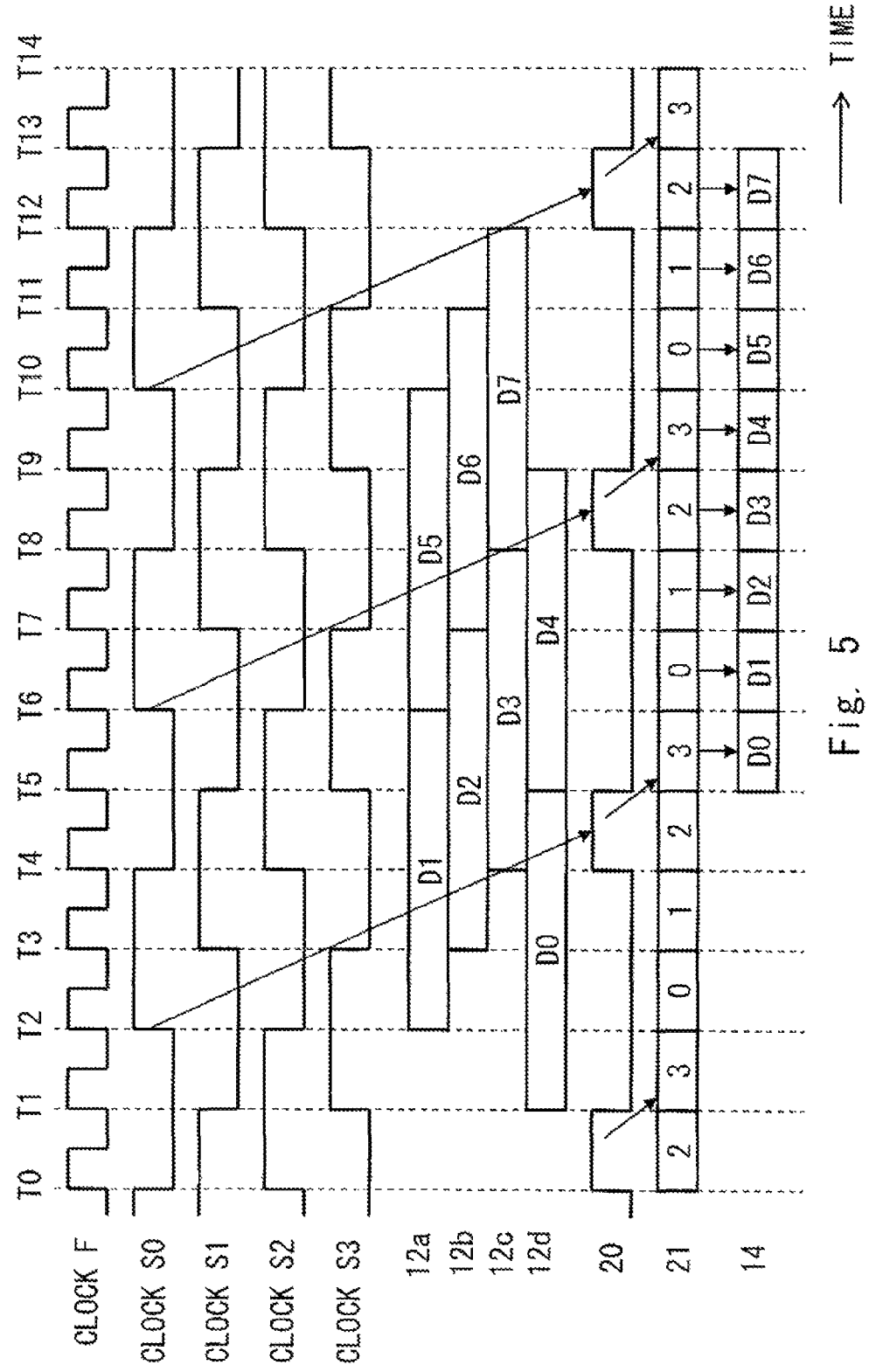
FIG. 5 is a timing chart showing an operation of the communication circuit between function blocks according to the second exemplary embodiment.

Next, an example of the operation of the communication circuit 10 according to the exemplary embodiment is described with reference to FIG. 5. In FIG. 5, the operating waveforms of the phase signal 20 and the data selection signal 21 are added to FIG. 2 illustrating the operation timing according to the first exemplary embodiment. In the operation of the communication circuit between function blocks according to this exemplary embodiment, the operation common to that in the first exemplary embodiment is not redundantly described.

In FIG. 5, the clock S0 rises at the timing T2, T6 and T10. The phase detection circuit 60 detects the rising timing of the clock S0 and thereby generates the phase signal 20 which becomes "1" two cycles after the timing at the rising edge of the clock S0 and becomes "0" at the other timing.

At this time, the phase signal 20 becomes "1" two cycles after the rising timing of the clock S0. Further, the phase signal 20 becomes "1" one cycle after the rising timing of the clock S1. Further, the phase signal 20 becomes "1" at the rising timing of the clock S2. Further, the phase signal 20 becomes "1" one cycle before the rising timing of the clock S3. Based on the timing information, the phase signal 20 can indicate the phase relationship of the clocks S0 to S3. Specifically, the phase signal 20 becomes "1" at the timing T4, T8, T12 and so on, and becomes "0" at the other timing.

The counter circuit 19 included in the output control circuit 17 performs a reset operation in the cycle next to the cycle in which the phase signal 20 becomes "1". Specifically, the counter circuit 19 performs a reset operation at the timing T5, T9, T13 and so on. A reset value in the reset operation is determined so that the count value of the counter circuit 19 can serve as an appropriate data selection signal 21.

In the ease of FIG. 5, at the timing T5, T9, T13 and so on where the counter circuit 19 performs a reset operation, the clock S3 rises, and data is stored into the output data storage circuit 15d. Thus, the reset value is set to "3" so that the selector circuit 18 selects output of the output data storage circuit 15d at the timing T5, T9, T13 and so on.

The counter circuit 19 resets the count value to "3" at the timing T5, T9, T13 and so on, then performs a count operation from "0" to "3", and outputs the count value as the data selection signal 21. Therefore, the output control circuit 17 selects the data D0 stored in the output data storage circuit 15d and outputs it to the signal 14 at the timing T5, for example. Likewise, the output control circuit 17 selects the data D1 stored in the output data storage circuit 15a and outputs it to the signal 14 at the timing T6. Likewise, the output control circuit 17 selects the data D2 stored in the output data storage circuit 15b and outputs it to the signal 14 at the timing T7. Likewise, the output control circuit 17 selects the data D3 stored in the output data storage circuit 15c and outputs it to the signal 14 at the timing T8.

As described above, according to the exemplary embodiment, the output control circuit 17 outputs the data stored in any of the output data storage circuits to the signal 14 in the sequence the data is stored. Further, the output control circuit 17 outputs the data stored in any of the output data storage circuits to the signal 14 in the cycle the data is stored. As a result, according to the exemplary embodiment, communication between function blocks with a low latency can be achieved for each data width of input and output of the function block and each cycle of the clock signal of the function block.

Third Exemplary Embodiment

Figure 6:
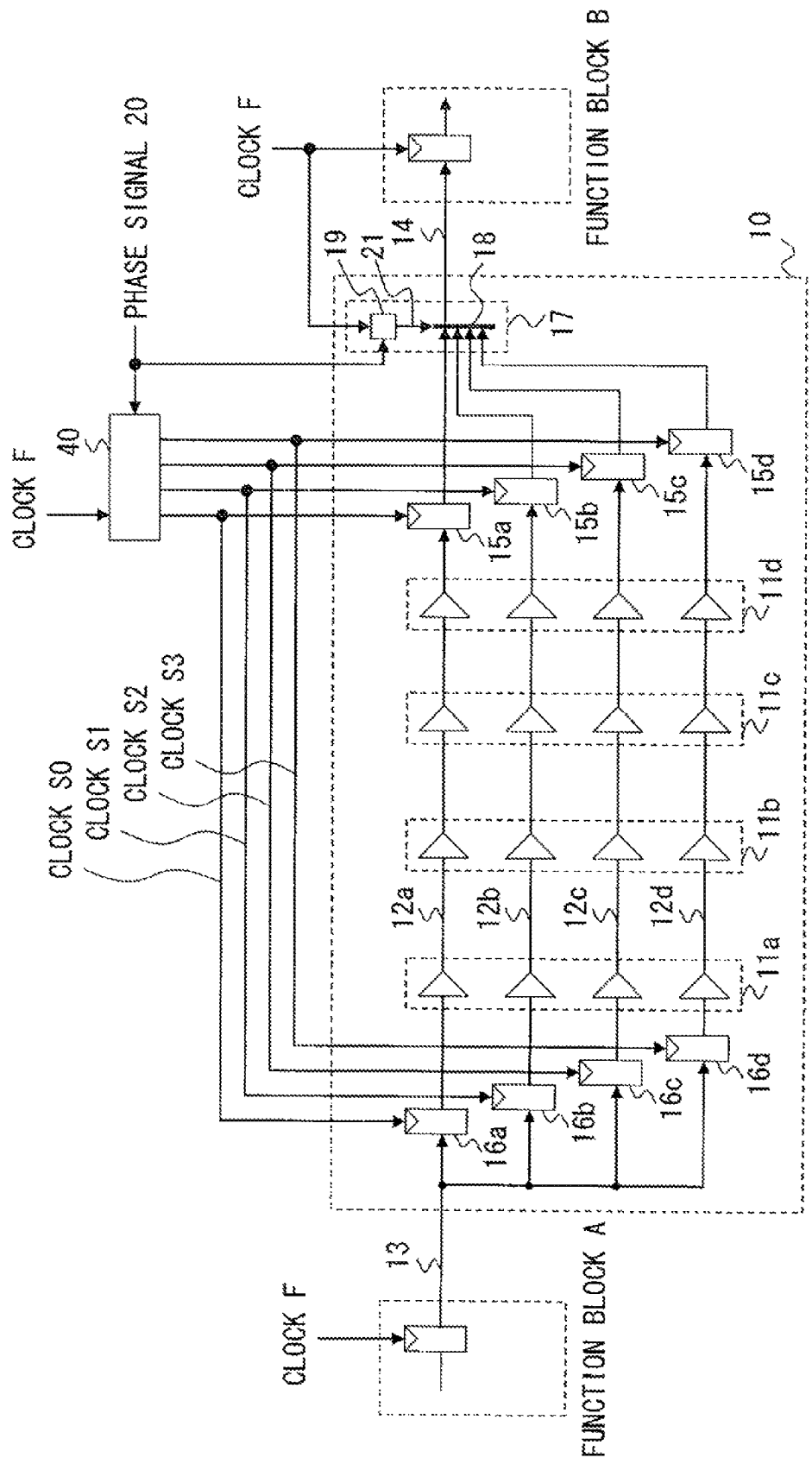
FIG. 6 is a block diagram showing a communication circuit between function blocks according to a third exemplary embodiment.

A communication circuit between function blocks according to a third exemplary embodiment of the present invention is described hereinafter with reference to FIG. 6. The communication circuit between function blocks according to this exemplary embodiment shown in FIG. 6 has a configuration in which a clock generation circuit (clock generation means) 40 that divides the clock F and generates the clocks S0 to S3 is added to the communication circuit between function blocks described in the first exemplary embodiment. In the communication circuit between function blocks according to this exemplary embodiment, the components common to those in the first exemplary embodiment are not redundantly described.

An output selection circuit 17 includes a selector circuit 18 and a counter circuit 19 as in the first exemplary embodiment. The selector circuit 18 selects any one of outputs of the output data storage circuits 15a, 15b, 15c and 15d according to a data selection signal 21 that is output from the counter circuit 19 and outputs the selected one to the signal 14.

Specifically, when the value of the data selection signal 21 is "0", the selector circuit 18 selects output of the output data storage circuit 15a and outputs it to the signal 14. When the value of the data selection signal 21 is "1", the selector circuit 18 selects output of the output data storage circuit 15b and outputs it to the signal 14. When the value of the data selection signal 21 is "2", the selector circuit 18 selects output of the output data storage circuit 15c and outputs it to the signal 14. When the value of the data selection signal 21 is "3", the selector circuit 18 selects output of the output data storage circuit 15d and outputs it to the signal 14.

The clock generation circuit 40 generates the clocks S0 to S3 by referring to a phase signal 20 which is supplied from a higher-level circuit. Thus, the phases of the clocks S0 to S3 are determined on the basis of the phase signal 20.

Figure 7:
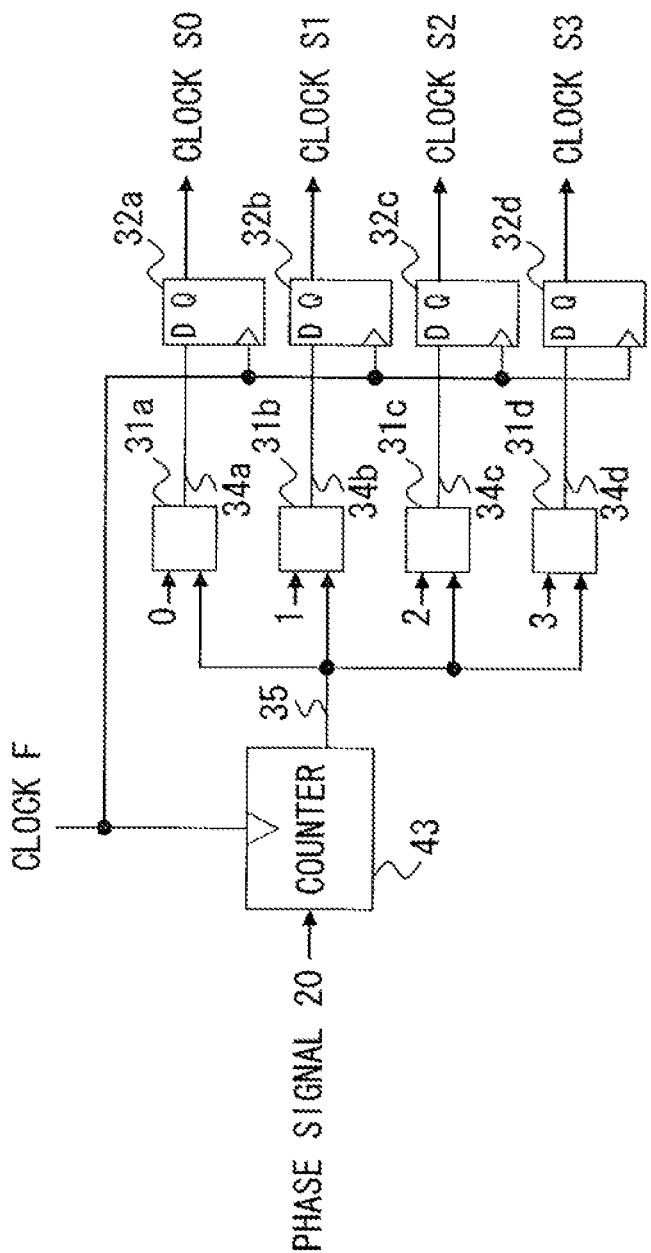
FIG. 7 is a block diagram showing a clock signal generation circuit of the communication circuit between function blocks according to the third exemplary embodiment.

FIG. 7 is a specific example of the clock generation circuit 40. The clock generation circuit 40 includes a counter circuit 43, four decoder circuits 31a, 31b, 31c and 31d, and four flip-flop circuits 32a, 32b, 32c and 32d. The counter circuit 43 performs a count operation by the clock F and outputs the count value as a count value 35. Further, the counter circuit 43 performs a reset operation by referring to the phase signal 20.

The decoder circuits 31a, 31b, 31c and 31d receive the count value 35 and generate clock values 34a, 34b, 34c and 34d for generating clocks S0 to S3, respectively. Specifically, the decoder circuit 31a generates the clock value 34a that rises to "1" when the count value 35 is "0". The decoder circuit 31b generates the clock value 34b that rises to "1" when the count value 35 is "1". The decoder circuit 31c generates the clock value 34c that rises to "1" when the count value 35 is "2". The decoder circuit 31d generates the clock value 34d that rises to "1" when the count value 35 is "3".

The flip-flop circuits 32a, 32b, 32c and 32d respectively latch the clock values 34a, 34b, 34c and 34d at the timing of the clock F and output them as the clocks S0 to S3.

Figure 8:
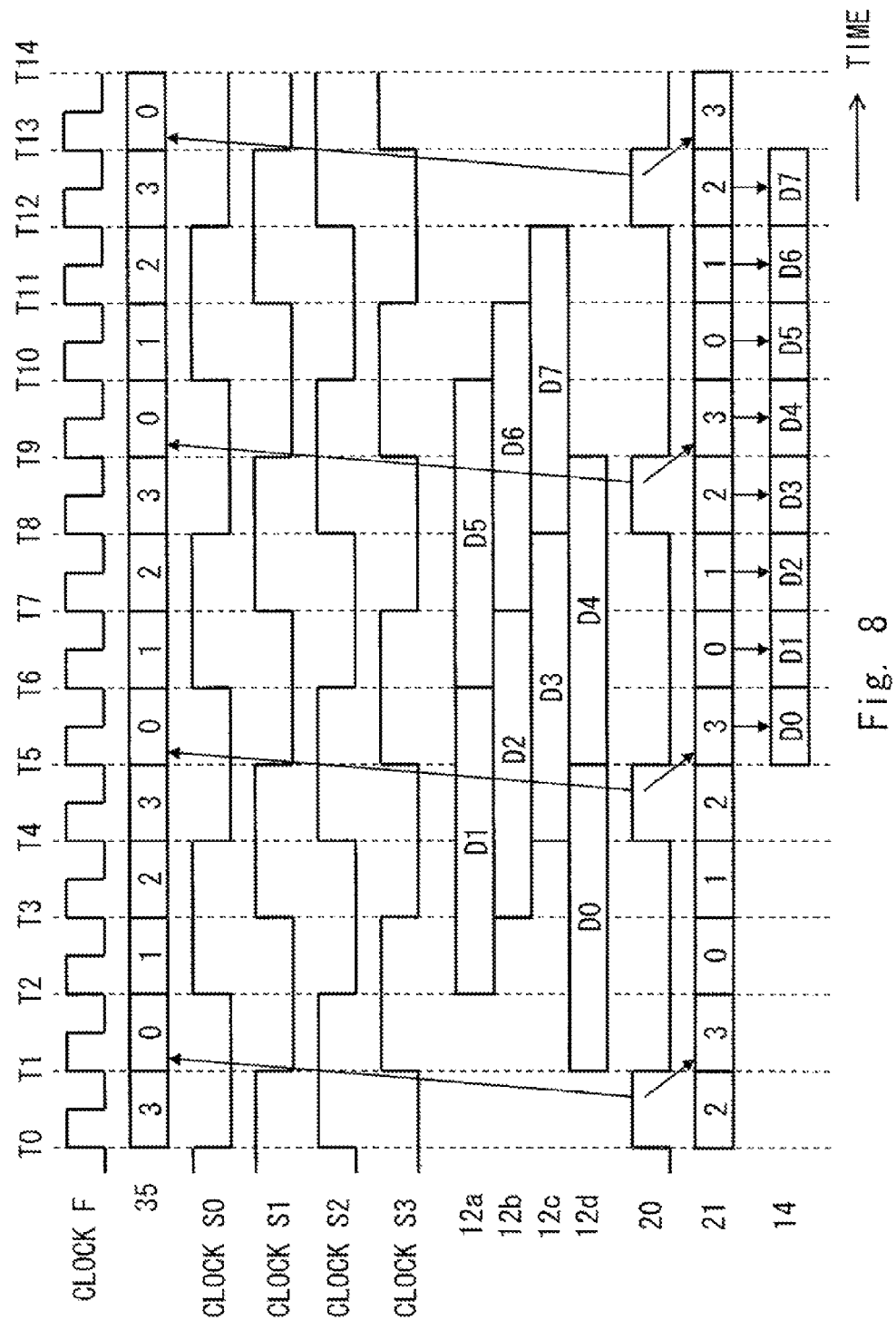
FIG. 8 is a timing chart showing an operation of the communication circuit between function blocks according to the third exemplary embodiment.

Next, an example of the operation of the communication circuit 10 according to the exemplary embodiment is described with reference to FIG. 8. In FIG. 8, the operating waveforms of the count value 35, the phase signal 20 and the data selection signal 21 are added to FIG. 2 illustrating the operation timing according to the first exemplary embodiment. In the operation of the communication circuit between function blocks according to this exemplary embodiment, the operation common to that in the first exemplary embodiment is not redundantly described.

In FIG. 8, the phase signal 20 which is supplied from a higher-level circuit becomes "1" at the timing T0, T4, T8 and T12. The counter circuit 43 included in the clock generation circuit 40 performs a reset operation to reset the count value to "0" in the cycle next to the cycle in which the phase signal 20 becomes "1". Specifically, the counter circuit 43 performs a reset operation at the timing T1, T5, T9 and T13. After that, the counter circuit 43 performs a count operation from "0" to "3", and outputs the count value as the count value 35. By referring to the count value 35, the decoder circuits 31a, 31b, 31c and 31d generate the clock values 34a, 34b, 34c and 34d, respectively.

As a result, the clock S0 that is generated from the clock value 34a rises at the timing T2, T6 and T10. Likewise, the clock S1 that is generated from the clock value 34b rises at the timing T3, T7 and T11. Likewise, the clock S2 that is generated from the clock value 34c rises at the timing T0, T4, T8 and T12. Likewise, the clock S3 that is generated from the clock value 34d rises at the timing T1, T5, T9 and T13.

On the other hand, the counter circuit 19 included in the output control circuit 17 performs a reset operation in the cycle next to the cycle in which the phase signal 20 becomes "1". Specifically, the counter circuit 19 performs a reset operation at the timing T5, T9, T13 and so on. A reset value in the reset operation is determined so that the count value of the counter circuit 19 can serve as an appropriate data selection signal 21. In the case of FIG. 8, at the timing T5, T9, T13 and so on where the counter circuit 19 performs a reset operation, the clock S3 rises, and data is stored into the output data storage circuit 15d. Thus, the reset value is set to "3" so that the selector circuit 18 selects output of the output data storage circuit 15d at the timing T5, T9, T13 and so on.

The counter circuit 19 resets the count value to "3" at the timing T5, T9, T13 and so on, then performs a count operation from "0" to "3", and outputs the count value as the data selection signal 21. Therefore, the output control circuit 17 selects the data D0 stored in the output data storage circuit 15d and outputs it to the signal 14 at the timing T5, for example. Likewise, the output control circuit 17 selects the data D1 stored in the output data storage circuit 15a and outputs it to the signal 14 at the timing T6. Likewise, the output control circuit 17 selects the data D2 stored in the output data storage circuit 15b and outputs it to the signal 14 at the timing T7. Likewise, the output control circuit 17 selects the data D3 stored in the output data storage circuit 15c and outputs it to the signal 14 at the timing T8.

As described above, according to the exemplary embodiment, the output control circuit 17 outputs the data stored in any of the output data storage circuits to the signal 14 in the sequence the data is stored. Further, the output control circuit 17 outputs the data stored in any of the output data storage circuits to the signal 14 in the cycle the data is stored. As a result, according to the exemplary embodiment, communication between function blocks with a low latency can be achieved for each data width of input and output of the function block and each cycle of the clock signal of the function block.

Fourth Exemplary Embodiment

Figure 9:
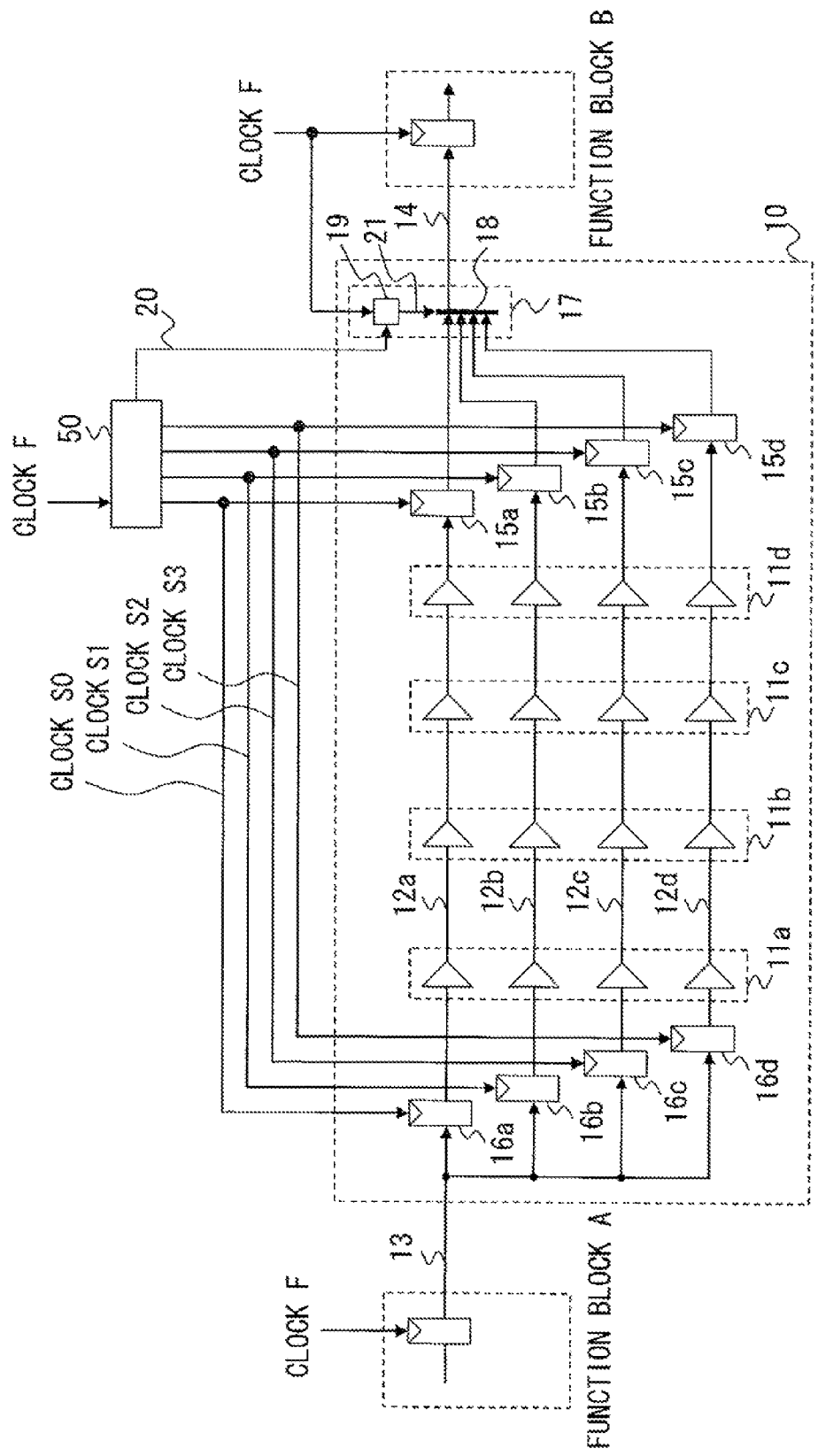
FIG. 9 is a block diagram showing a communication circuit between function blocks according to a fourth exemplary embodiment.

A communication circuit between function blocks according to a fourth exemplary embodiment of the present invention is described hereinafter with reference to FIG. 9. The communication circuit between function blocks according to this exemplary embodiment shown in FIG. 9 has a configuration in which a clock generation circuit (clock generation means) 50 that divides the clock F and generates the clocks S0 to S3 is added to the configuration of the communication circuit between function blocks described in the first exemplary embodiment. In the communication circuit between function blocks according to this exemplary embodiment, the components common to those in the first exemplary embodiment are not redundantly described.

An output selection circuit 17 includes a selector circuit 18 and a counter circuit 19 as in the first exemplary embodiment. The selector circuit 18 selects any one of outputs of the output data storage circuits 15a, 15b, 15c and 15d according to a data selection signal 21 that is output from the counter circuit 19 and outputs the selected one to the signal 14.

Specifically, when the value of the data selection signal 21 is "0", the selector circuit 18 selects output of the output data storage circuit 15a and outputs it to the signal 14. When the value of the data selection signal 21 is "1", the selector circuit 18 selects output of the output data storage circuit 15b and outputs it to the signal 14. When the value of the data selection signal 21 is "2", the selector circuit 18 selects output of the output data storage circuit 15c and outputs it to the signal 14. When the value of the data selection signal 21 is "3", the selector circuit 18 selects output of the output data storage circuit 15d and outputs it to the signal 14.

Figure 10:
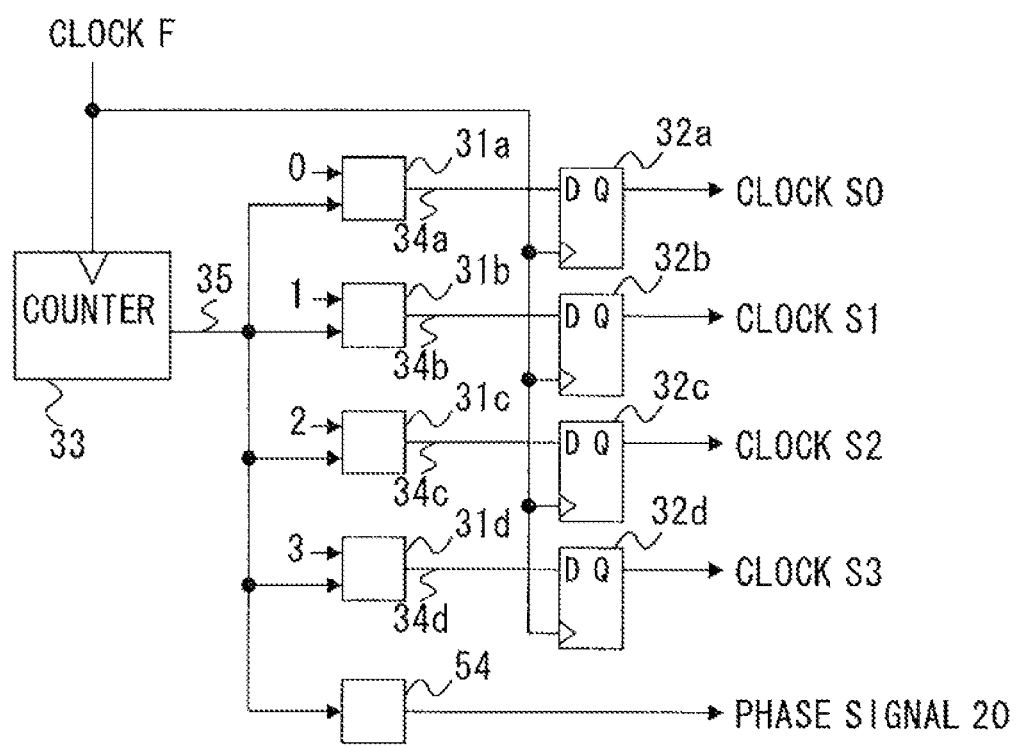
FIG. 10 is a block diagram showing a clock signal generation circuit of the communication circuit between function blocks according to the fourth exemplary embodiment.

The clock generation circuit 50 generates the clocks S0 to S3 and, at the same time, generates phase information 20 which indicates information about the phase relationship of the clocks S0 to S3, and outputs them. FIG. 10 is a specific example of the clock generation circuit 50. The clock generation circuit 50 includes a counter circuit 33, four decoder circuits 31a, 31b, 31c and 31d, four flip-flop circuits 32a, 32b, 32c and 32d, and a decoder circuit 54. The counter circuit 33 performs a count operation by the clock F and outputs the count value as a count value 35. The decoder circuits 31a, 31b, 31c and 31d receive the count value 35 and generate clock values 34a, 34b, 34c and 34d for generating the clocks S0 to S3, respectively.

Specifically, the decoder circuit 31a generates the clock value 34a that rises to "1" when the count value 35 is "0". The decoder circuit 31b generates the clock value 34b that rises to "1" when the count value 35 is "1". The decoder circuit 31c generates the clock value 34c that rises to "1" when the count value 35 is "2". The decoder circuit 31d generates the clock value 34d that rises to "1" when the count value 35 is "3".

The flip-flop circuits 32a, 32b, 32c and 32d respectively latch the clock values 34a, 34b, 34c and 34d at the timing of the clock F and output them as the clocks S0 to S3.

The decoder circuit 54 generates a phase signal 20 from the input count value 35 and outputs it. Specifically, the decoder circuit 54 outputs "1" when the count value 35 is "0" and outputs "0" when other times as the phase signal 20.

Figure 11:
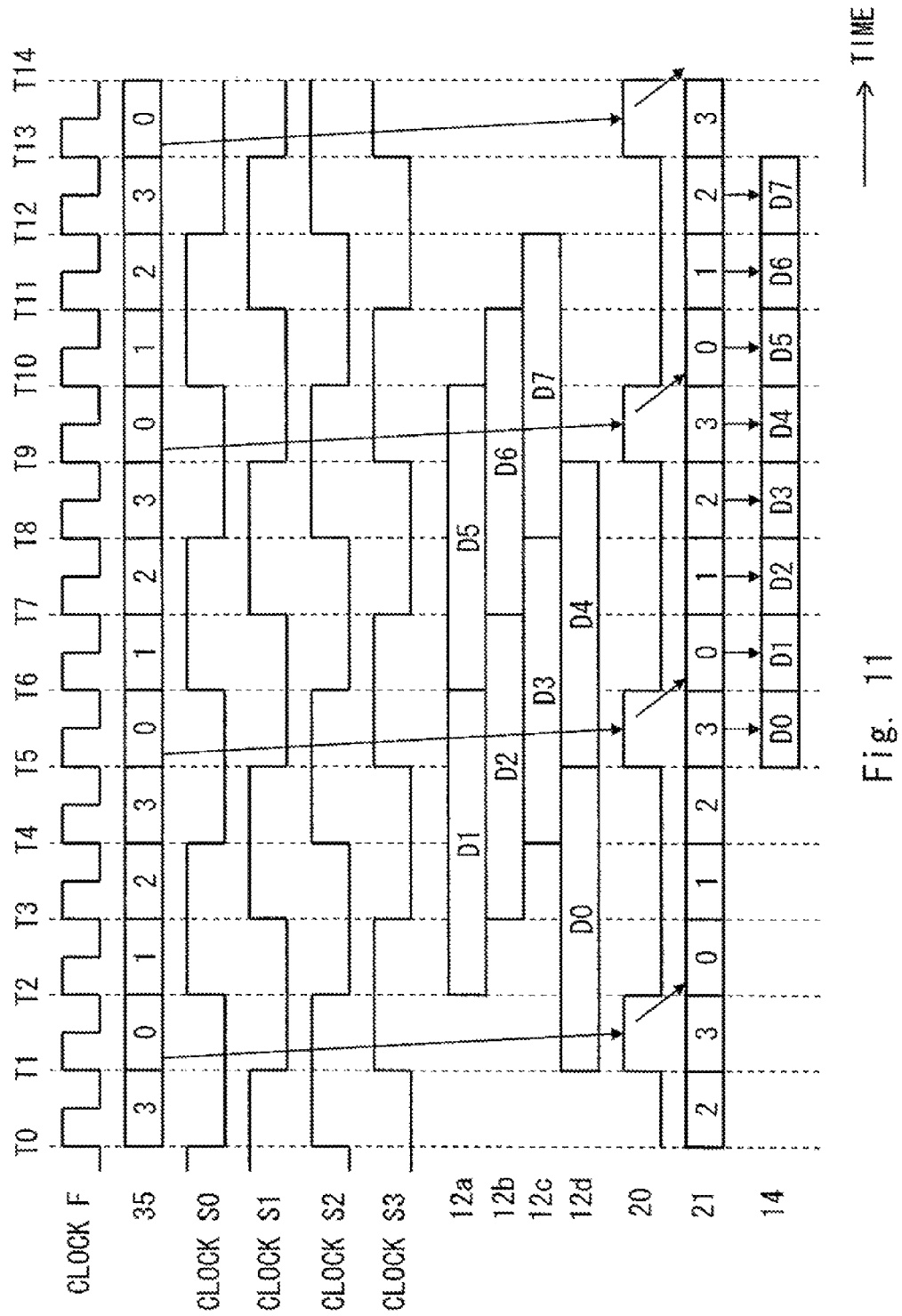
FIG. 11 is a timing chart showing an operation of the communication circuit between function blocks according to the fourth exemplary embodiment.
Figure 12:
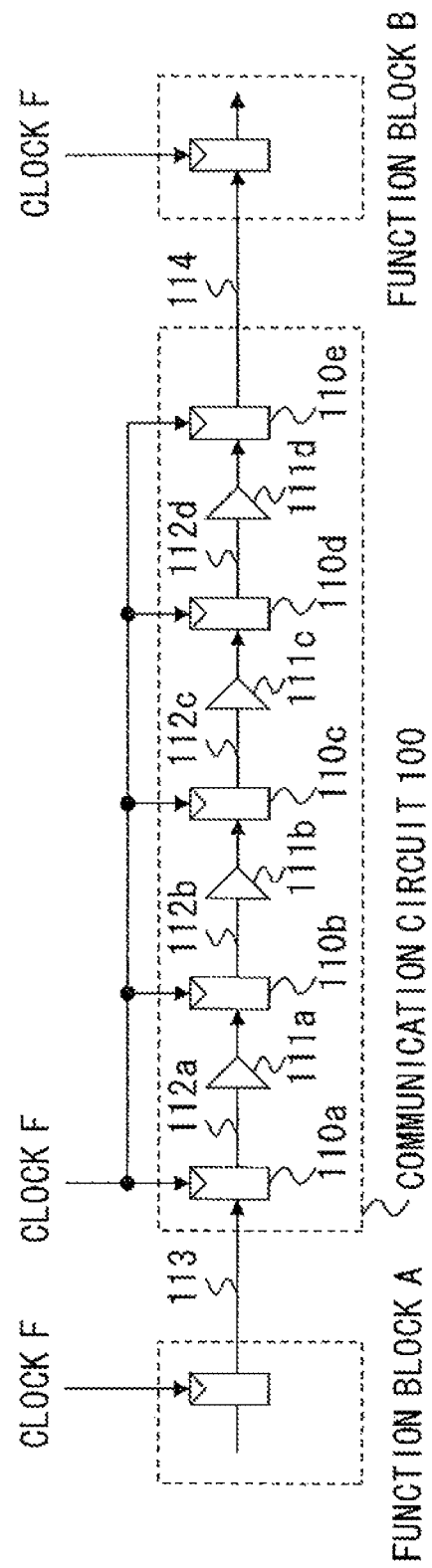
FIG. 12 is a block diagram showing a communication circuit between function blocks according to related art.
Figure 13:
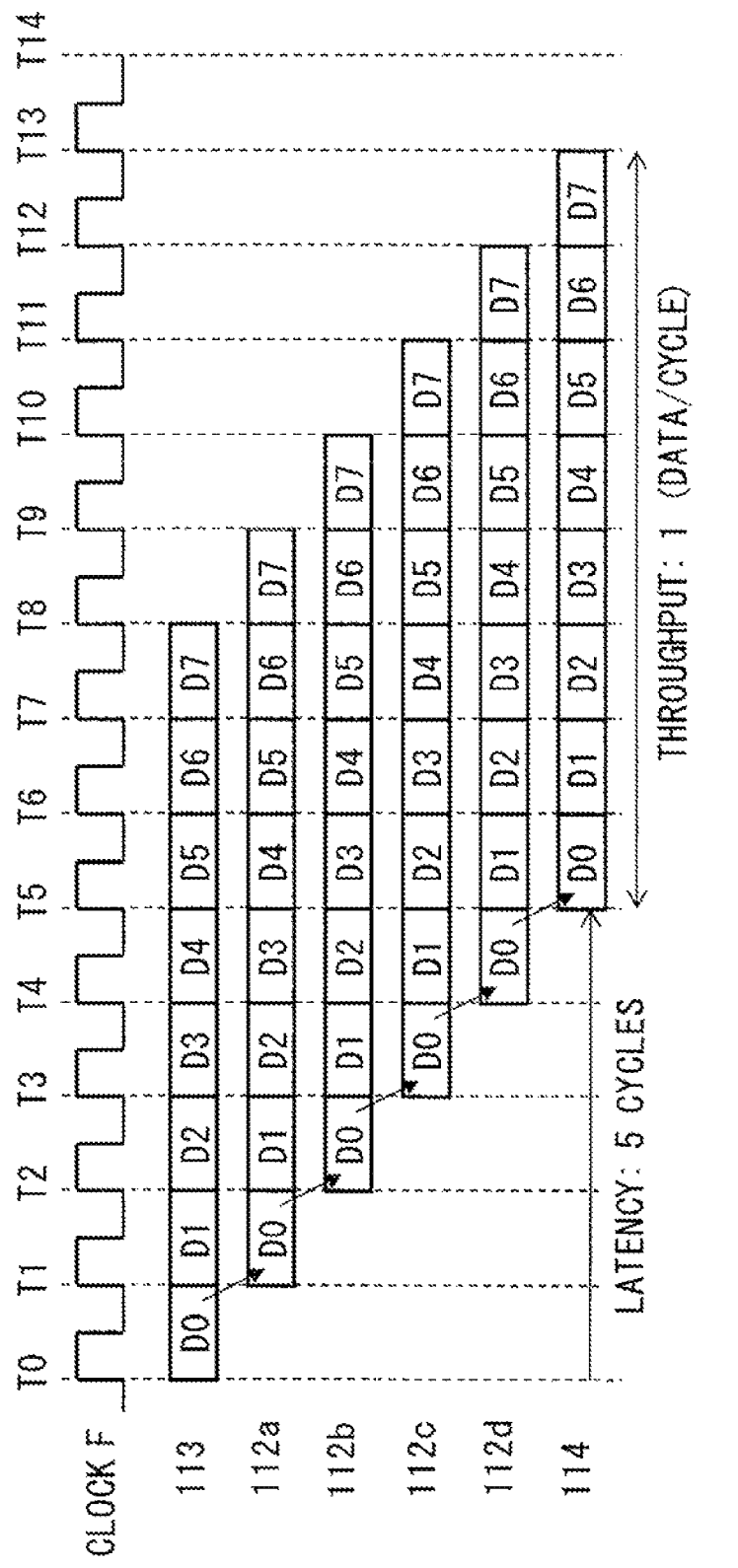
FIG. 13 is a timing chart showing an operation of a communication circuit between function blocks according to related art.
Figure 14:
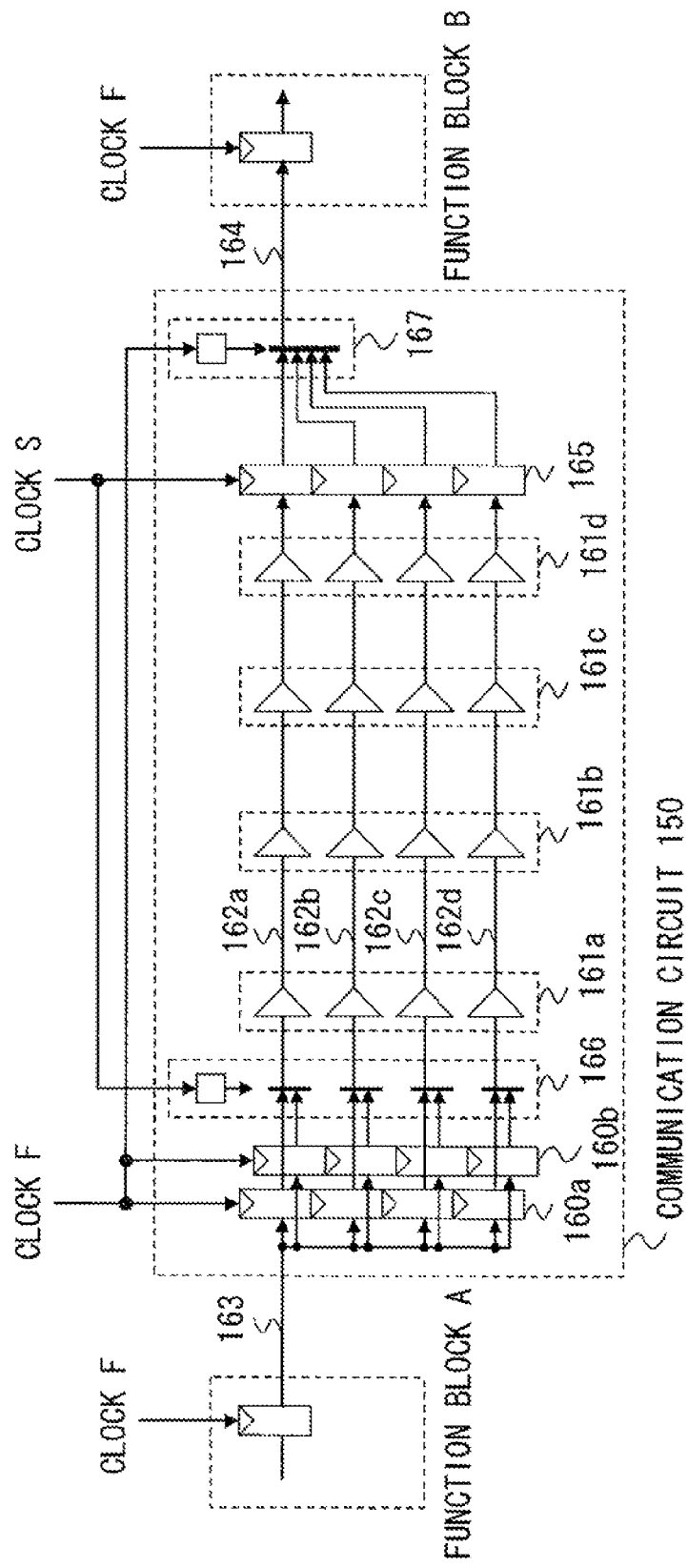
FIG. 14 is a block diagram showing a communication circuit between function blocks according to related art.
Figure 15:
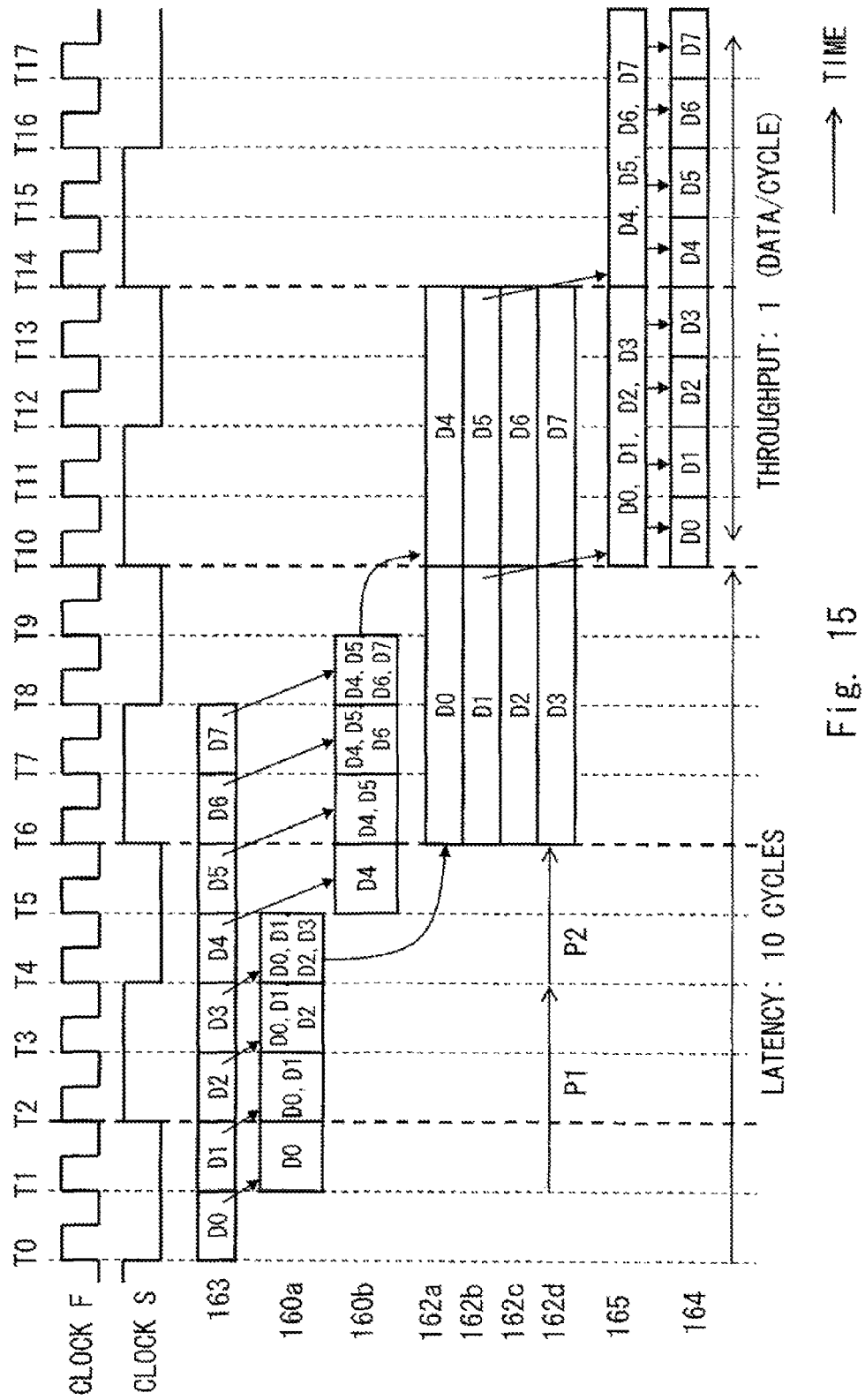
FIG. 15 is a timing chart showing an operation of a communication circuit between function blocks according to related art.

Next, an example of the operation of the communication circuit 10 according to the exemplary embodiment is described with reference to FIG. 11. In FIG. 11, the operating waveforms of the count value 35, the phase signal 20 and the data selection signal 21 are added to FIG. 2 illustrating the operation timing according to the first exemplary embodiment. In the operation of the communication circuit between function blocks according to this exemplary embodiment, the operation common to that in the first exemplary embodiment is not redundantly described.

The counter circuit 33 included in the clock generation circuit 50 performs a count operation from "0" to "3", and outputs the count value as the count value 35. In FIG. 11, the count value becomes "0" at the timing T1, T5, T9, T13 and so on. By referring to the count value 35, the decoder circuits 31a, 31b, 31c and 31d generate the clock values 34a, 34b, 34c and 34d, respectively.

As a result, the clock S0 that is generated from the clock value 34a rises at the timing T2, T6, T10 and so on. Likewise, the clock S1 that is generated from the clock value 34b rises at the timing T3, T7, T11 and so on. Likewise, the clock S2 that is generated from the clock value 34c rises at the timing T0, T4, T8, T12 and so on. Likewise, the clock S3 that is generated from the clock value 34d rises at the timing T1, T5, T9, T13 and so on.

Further, the clock generation circuit 50 generates the phase signal 20 according to the count value 35 and outputs it. In FIG. 11, the phase signal 20 becomes "1" at the timing T1, T5, T9, T13 and so on where the count value 35 becomes "0".

On the other hand, the counter circuit 19 included in the output control circuit 17 performs a reset operation in the cycle next to the cycle in which the phase signal 20 becomes "1". Specifically, the counter circuit 19 performs a reset operation at the timing T2, T6, T10 and so on. A reset value in the reset operation is determined so that the count value of the counter circuit 19 can serve as an appropriate data selection signal 21. In the case of FIG. 11, at the timing T2, T6, T10 and so on where the counter circuit 19 performs a reset operation, the clock S0 rises, and data is stored into the output data storage circuit 15a. Thus, the reset value is set to "0" so that the selector circuit 18 selects output of the output data storage circuit 15a at the timing T2, T6, T10 and so on.

The counter circuit 19 resets the count value to "0" at the T2, T6, T10 and so on, then performs a count operation from "0" to "3", and outputs the count value as the data selection signal 21. Therefore, the output control circuit 17 selects the data D0 stored in the output data storage circuit 15d and outputs it to the signal 14 at the timing T5, for example. Likewise, the output control circuit 17 selects the data D1 stored in the output data storage circuit 15a and outputs it to the signal 14 at the timing T6. Likewise, the output control circuit 17 selects the data D2 stored in the output data storage circuit 15b and outputs it to the signal 14 at the timing T7. Likewise, the output control circuit 17 selects the data D3 stored in the output data storage circuit 15c and outputs it to the signal 14 at the timing T8.

As described above, according to the exemplary embodiment, the output control circuit 17 outputs the data stored in any of the output data storage circuits to the signal 14 in the sequence the data is stored. Further, the output control circuit 17 outputs the data stored in any of the output data storage circuits to the signal 14 in the cycle the data is stored. As a result, according to the exemplary embodiment, communication between function blocks with a low latency can be achieved for each data width of input and output of the function block and each cycle of the clock signal of the function block.

Although the exemplary embodiments of the present invention are described in the foregoing, the present invention is not restricted to the above-described exemplary embodiments, and various changes, modifications and combinations as would be obvious to one skilled in the art are intended for inclusion within the scope of the present invention.

This application is based upon and claims the benefit of priority from Japanese patent application No. 2009-120126 filed on May 18, 2009 the disclosure of which is incorporated herein in its entirety by reference.

REFERENCE SIGNS LIST

10 COMMUNICATION CIRCUIT
11a, 11b, 11c, 11d BUFFER CIRCUIT
12a, 12b, 12c, 12d, 13, 14 SIGNAL
15a, 15b, 15c, 15d OUTPUT DATA STORAGE CIRCUIT
16a, 16b, 16c, 16d INPUT DATA STORAGE CIRCUIT
17 OUTPUT CONTROL CIRCUIT
18 SELECTOR CIRCUIT
19 COUNTER CIRCUIT
20 PHASE SIGNAL
21 DATA SELECTION SIGNAL
31a, 31b, 31c, 31d DECODER CIRCUIT
32a, 32b, 32c, 32d FLIP-FLOP CIRCUIT

33 COUNTER CIRCUIT
35 COUNT VALUE
40 CLOCK SIGNAL GENERATION CIRCUIT
43 COUNTER CIRCUIT
50 CLOCK SIGNAL GENERATION CIRCUIT
54 DECODER CIRCUIT
60 PHASE DETECTION CIRCUIT
65 TOGGLE CIRCUIT
70 TOGGLE DETECTION CIRCUIT
100 COMMUNICATION CIRCUIT
110a, 110b, 110c, 110d, 110e PIPELINE REGISTER
111a, 111b, 111c, 111d BUFFER CIRCUIT
112A, 112B, 112C, 112D SUB-SIGNAL
113, 114 SIGNAL
150 COMMUNICATION CIRCUIT
160a, 160b INPUT DATA STORAGE CIRCUIT
161a, 161b, 161c, 161d BUFFER CIRCUIT
162a, 162b, 162c, 162d, 163, 164 SIGNAL
165 OUTPUT DATA STORAGE CIRCUIT
166 INPUT CONTROL CIRCUIT
167 OUTPUT CONTROL CIRCUIT

The invention claimed is:

1. A communication circuit connected with a plurality of function blocks that perform processing based on a first clock signal, and mediates communication between the function blocks, comprising:
N number of communication means, where N is a positive integer (N>1), having the same data width as communication data output from the function blocks,
wherein each of the N number of communication means performs communication processing based on N number of second clock signals specified by 1/N of a frequency of the first clock signal, respectively corresponding to the N number of communication means and having a phase difference of 360/N degrees from each other.

2. The communication circuit according to claim 1, wherein the communication means at least includes:
an input data storage means for inputting and storing the communication data output from the function block,
a data transfer means for transferring the data stored in the input data storage means, and
an output data storage means for storing the data transferred by the data transfer means.

3. The communication circuit according to claim 2, comprising:
an output control means for selecting and outputting any one of the data transferred and output by the N number of communication means in a sequence stored in the output data storage means by referring to a phase signal indicating a phase relationship of the N number of second clock signals.

4. The communication circuit according to claim 3, further comprising:
a phase detection means for detecting a phase of any clock signal among the N number of second clock signals and generating the phase signal.

5. The communication circuit according to claim 3, further comprising:
a clock generation means for generating the N number of second clock signals, wherein
the clock generation means controls the phase relationship of the N number of second clock signals by referring to the phase signal.

6. The communication circuit according to claim 3, further comprising:
a clock generation means for generating the N number of second clock signals and further generating and outputting the phase signal.

7. A communication method using a communication circuit connected with a first function block and a second function block and transferring communication data from the first function block to the second function block, the communication circuit including first to Nth communication means, where N is a positive integer (N>1), having the same data width as the communication data output from the first function block, the method comprising:
inputting the communication data output from the first function block according to a first clock signal to the first to Nth communication means based on second clock signals specified by 1/N of a frequency of the first clock signal and having first to Nth phases with a phase difference of 360/N degrees from each other; and
outputting the communication data supplied to the first to Nth communication means to the second function block based on the second clock signals having the first to Nth phases.

8. The communication method according to claim 7, wherein when outputting the communication data supplied to the first to Nth communication means to the second function block based on the second clock signals having the first to Nth phases, the communication data supplied to the first to Nth communication means is output to the second function block based on a second clock signal having a phase corresponding to a phase of a second clock signal when inputting the communication data among the second clock signals having the first to Nth phases.

9. The communication method according to claim 7, wherein when outputting the communication data supplied to the first to Nth communication means to the second function block based on the second clock signals having the first to Nth phases, the communication data supplied to the first to Nth communication means is output to the second function block in a sequence supplied to the communication means by referring to a phase signal indicating a phase relationship of the second clock signals having the first to Nth phases.

10. The communication method according to claim 9, comprising:
detecting a second clock signal having any phase among the first to Nth phases and generating the phase signal.

11. The communication method according to claim 9, comprising:
generating the second clock signals having the first to Nth phases, and controlling the phase relationship of the second clock signals by referring to the phase signal.

12. The communication method according to claim 8, wherein when outputting the communication data supplied to the first to Nth communication means to the second function block based on the second clock signals having the first to Nth phases, the communication data supplied to the first to Nth communication means is output to the second function block in a sequence supplied to the communication means by referring to a phase signal indicating a phase relationship of the second clock signals having the first to Nth phases.

13. The communication method according to claim 12, comprising:
detecting a second clock signal having any phase among the first to Nth phases and generating the phase signal.

14. The communication method according to claim 12, comprising:

generating the second clock signals having the first to Nth phases, and controlling the phase relationship of the second clock signals by referring to the phase signal.

\* \* \* \* \*